Figure 1:
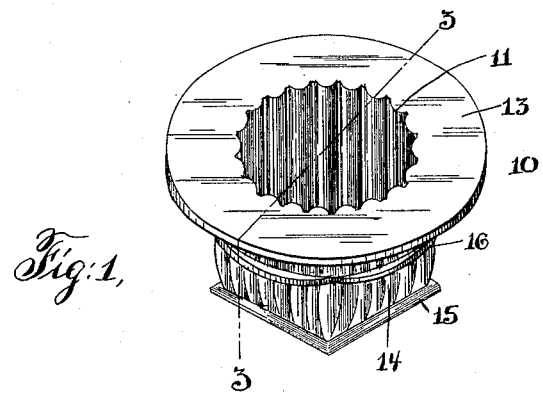

R. ROUSE, Jr.
FIRE POT.
APPLICATION FILED APR. 6, 1911.

1,006,503.

Patented Oct. 24, 1911.

Witnesses:
Arthur G. Dannell,
M. F. O'Donnell.

Richard Rouse Jr. Inventor,
By his Attorney,
W. P. Hutchinson.

COLUMBIA PLANOGRAPH CO., WASHINGTON, D. C.

UNITED STATES PATENT OFFICE.

RICHARD ROUSE, JR., OF NEWARK, NEW JERSEY, ASSIGNOR TO BOYNTON FURNACE COMPANY, OF NEW YORK, N. Y., A CORPORATION OF NEW JERSEY.

FIRE-POT.

1,006,503.

Specification of Letters Patent.  Patented Oct. 24, 1911.

Application filed April 6, 1911. Serial No. 619,439.

*To all whom it may concern:*

Be it known that I, RICHARD ROUSE, Jr., of Newark, Essex county, New Jersey, have invented a new and useful Improvement in Fire-Pots, of which the following is a full, clear, and exact description.

My invention relates to improvements in fire pots for furnaces, ranges, and the like, and more especially to improvements in so-called square pots such as shown in Letters Patent of the United States No. 749,203, dated January 11th, 1904. These so-called square pot furnaces are usually circular at the top and generally rectangular at the bottom, with tapering sides preferably corrugated, and they are desirable because more complete combustion is afforded by pots of this character, and a cleaner surface next the grate is maintained. In practice, however, it sometimes happens, especially where soft coal is used and an intense heat generated, that the pots of this character will weaken on the generally flat sides, and crack or cave in.

The object of my present invention is to overcome this difficulty and construct the pot so that without unduly increasing its weight, its strength will be greatly increased and the characteristics of the generally square bottom and generally circular top maintained. I accomplish this result by making the side walls of the pot convex or bulging, and cause this convex structure to be produced on both vertical and horizontal planes. In this way the pot is greatly strengthened, while its desirable features above mentioned are maintained and the cost is not increased.

Reference is to be had to the accompanying drawings forming a part of this specification, in which similar reference characters indicate corresponding parts in all the views.

Figure 2:
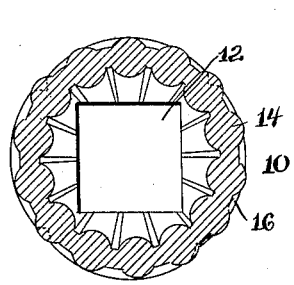
Figure 3:
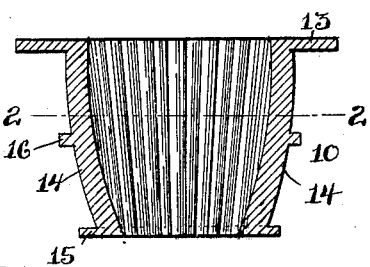
Figure 4:
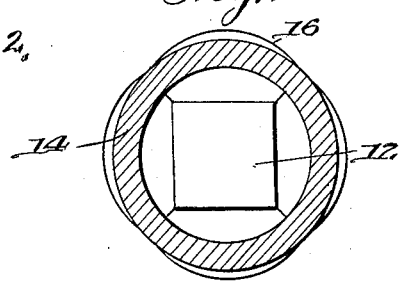

Figure 1 is a perspective view of a fire-pot showing my improvements. Fig. 2 is a cross section on the line 2—2 of Fig. 3, Fig. 3 is a vertical section of the pot, and Fig. 4 is a cross sectional view showing a modified form of my invention.

The fire pot 10 can obviously be made in any size and adapted for use in furnaces of various kinds, the pot having a generally circular conformation at the top as shown at 11, while the bottom, as shown at 12, is square or essentially so. I have shown the pot provided with a wide flange 13 at the top, but this feature of the construction is immaterial, as the shape, width, and general arrangement of the flange varies with different types of furnaces. The side walls 14 of the pot, however, are convex, and by reference to Figs. 2 and 3 it will be seen that the convexity occurs on both vertical and horizontal planes, and is especially noticeable opposite the flat or straight sides of the bottom, or on vertical lines coincident with these flat sides, because it is at these points that the fire pot needs strengthening. To further stiffen and strengthen the pot, which is usually made of cast iron, I provide ribs 15 and 16 at the bottom and around the middle portion of the pot, the ribs 16 being widest opposite the flatter sides so as to give the necessary increase in strength. In the drawing in Figs. 1, 2 and 3 I have shown the pot as corrugated, and this is the preferred construction, but the pot can be made plain, that is without corrugations, if preferred as shown in Fig. 4.

It will be understood of course that this fire pot can be used in connection with any usual form of furnace, and that any customary grate or preferred form of grate can be arranged below the pot.

From the foregoing description it will be understood that the principal feature of the invention lies in the construction of the side walls, and it will be noticed that this does not interfere with maintaining the usual general structure of the pot with its side walls tapering from top to bottom.

I claim:—

1. A fire pot open from top to bottom, with the upper portion of the opening generally circular, the lower portion generally rectangular, and the side walls laterally and vertically convex.

2. A fire pot having the top of its containing chamber generally circular and the bottom of said chamber generally rectangular, and the side walls of the pot opposite the straight sides of the bottom portion bulging both laterally and vertically.

3. As an improved article of manufacture, a fire pot having its combustion chamber generally circular at the top and generally rectangular at the bottom, and its side walls convex laterally and vertically, and horizontal strengthing ribs on the exterior of the pot.

4. An improved cast iron fire pot having a tapering containing chamber generally circular at the top and generally rectangular at the bottom, the side walls of the pot being outwardly bulging both laterally and vertically.

RICHARD ROUSE, Jr. [L. S.]

Witnesses:
CHAS. M. BENEDICT.
CHAS. L. WESTGATE.

Copies of this patent may be obtained for five cents each, by addressing the "Commissioner of Patents, Washington, D. C."